P. R. JANNEY.
FLEXIBLE DRAFT CONNECTION.
APPLICATION FILED MAY 25, 1918.
1,327,827.
Patented Jan. 13, 1920.
2 SHEETS—SHEET 1.
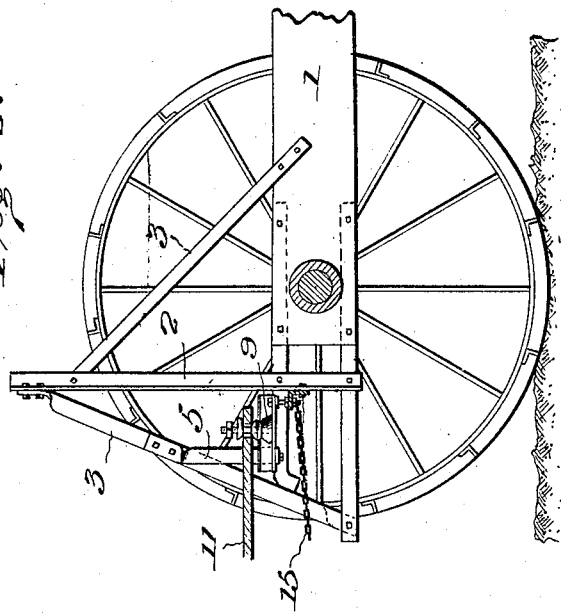
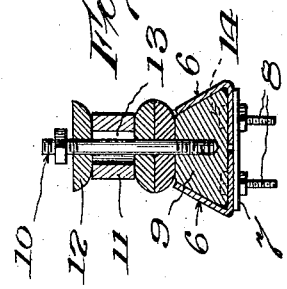
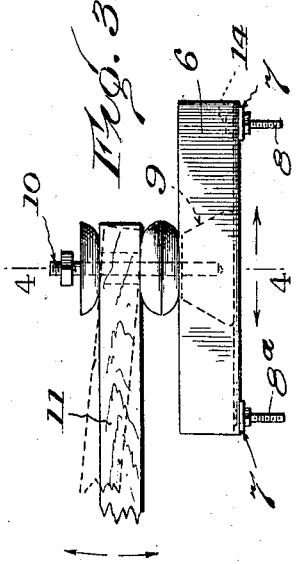
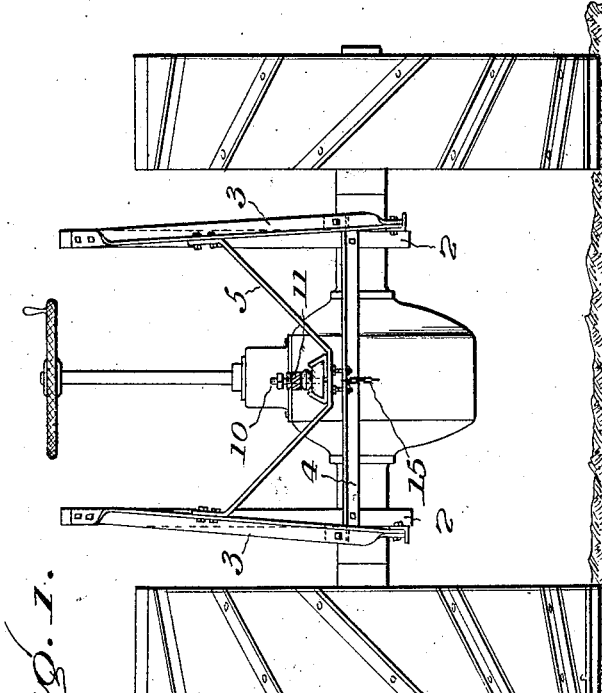
Inventor
Peyton R. Janney,
By
Attorney

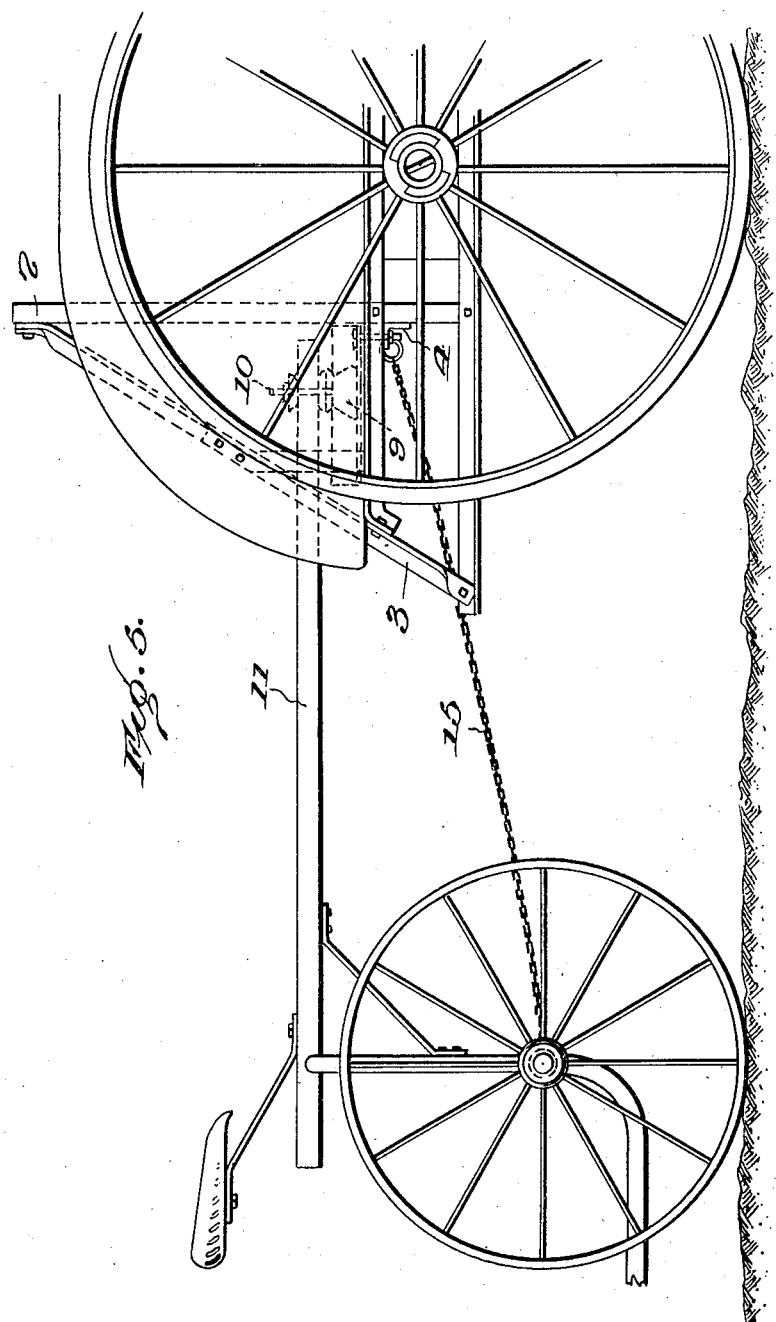

UNITED STATES PATENT OFFICE.

PEYTON R. JANNEY, OF DETROIT, MICHIGAN.

FLEXIBLE DRAFT CONNECTION.

1,327,827.        Specification of Letters Patent.     Patented Jan. 13, 1920.

Application filed May 25, 1918. Serial No. 236,504.

*To all whom it may concern:*

Be it known that I, PEYTON R. JANNEY, a citizen of the United States, residing at Detroit, in the county of Wayne and State of Michigan, have invented new and useful Improvements in Flexible Draft Connections, of which the following is a specification.

This invention relates to an improved device for flexibly connecting the draw bar or tongue of a trailing implement or vehicle to the rear of a preceding implement.

An object of the invention is to provide for a combined reciprocatory movement and a substantially universal movement for the draft connection and a tongue support between adjacent implements or vehicles.

A further object of the invention is to provide a flexible draft connection wherein the parts are constructed with a view of reducing the cost of manufacture, and at the same time retain those features by which safety, durability and ease of assembly and installation are secured.

Further features of the invention and structural details will be described in the following specification and claims and illustrated in the accompanying drawings, in which:—

Figure 1 represents a rear view of a tractor with the flexible draft connection and tongue support attached thereto.

Fig. 2 represents a side view, partly in section, of Fig. 1.

Fig. 3 represents an enlarged view of the flexible tongue support, showing a draw bar or tongue carried thereby.

Fig. 4 represents a vertical section taken on the line 4—4 of Fig. 3.

Fig. 5 illustrates the use of my flexible draft connection in connecting a tractor and a trailing implement.

The same reference numerals designate like parts throughout the several views.

Referring to the drawing, especially to Figs. 1 and 2, 1 represents the chassis of a tractor provided at the rear with the vertical standards 2. The standards 2 are detachably fastened to the tractor and suitably braced by means of forwardly and rearwardly extending brace rods 3. A horizontal cross support 4 and a substantially U-shaped support 5 are secured respectively to the vertical standards 2 and the rearwardly extending brace rods 3. Extending parallel with the chassis 1 is the flexible tongue support detachably secured at its ends to the supports 4 and 5. This tongue support, see Figs. 3 and 4, consists of two angle irons 6 fastened together at the bottom by means of the plates 7 and bolts 8 and 8ª. The sides of the angle irons 6 are bent inwardly, forming a dovetail trough or retaining member. A truncated supporting cone 9 frictionally engages the inner surface of the trough and carries rigid therewith a vertically disposed draft bolt or connecting rod 10. This connecting rod 10 supports the forward end of a tongue or draw bar 11 attached to a trailing implement or vehicle. Bearing plates 12, having spheroidal bearing surfaces, engage the upper and lower surface of the forward end of the draw bar 11. The draw bar 11 has a relatively large opening 13 which allows the draw bar to freely rock on the bearing plates 12. These bearing plates 12 are made with large spheroidal bearing surfaces, thus preventing any appreciable wear of the draw bar 11 caused by the rolling action or frictional movement of the draw bar on the bearing plates 12. The bolts 8 are provided with large heads 14 which act as stops to limit the forward movement of the supporting cone 9, while a draft chain 15, connected to the tractor and the trailing implement, limits the rearward movement of the supporting cone 9. The bolts 8ª are countersunk so as to permit the supporting cone 9 to escape from the trough and drop to the ground in case the draft chain 15 should break.

In operation, either in agricultural or military use, the tractor and trailing implement or vehicle coupled thereto are required at times to pass over extremely rough surfaces, one of the machines often being in a rut or hole and the other riding clear. At other times, one machine will be going up a sharp incline while the other is coming down, or the wheel or wheels of one raised suddenly by rocks or obstructions. It is thus evident that the draft connection used under these conditions will be subjected to great and unusual strains. The bearing plates 12 in my improved draft connection, having spheroidal bearing surfaces, provide for the strains by permitting the draw bar 11 to have a substantially universal movement, while the supporting cone 9 frictionally engaging the inner surfaces of the angle irons 6, during its forward and rearward movement, provides a snubbing device which eliminates sudden strains on the draft chain 15.

In the construction as shown and described, there is provided a very effective and strong construction which is able to withstand the shocks and strains to which the implements or vehicles are subjected in use.

What I claim as my invention and desire to secure by Letters Patent, is:—

1. In combination with a vehicle, a supporting frame carried by said vehicle, a retaining member carried by said frame, a slidable member carried by said retaining member having a vertically extending connecting rod, and a draw bar loosely carried by said connecting rod.

2. In combination with a vehicle, a supporting frame carried by said vehicle, a retaining member carried by said frame, a slidable member carried by said retaining member having a vertically extending connecting rod, a spheroidal bearing member carried by said connecting rod, and a draw bar loosely carried by said connecting rod and engaging said bearing member.

3. In combination with a vehicle, a supporting frame carried by said vehicle, a retaining member carried by said frame, a slidable member carried by said retaining member, a vertically extending connecting rod carried by said slidable member, a draw bar loosely carried by said connecting rod, and means on said retaining member for limiting the movement of said slidable member.

4. A draft appliance comprising a retaining member, a slidable member held by said retaining member, a connecting rod fixedly carried by said slidable member, a spheroidal bearing member carried by said connecting rod, and a draw bar carried by said connecting rod and engaging said bearing plate.

5. A draft appliance comprising a retaining member, a slidable member held by said retaining member, a connecting rod fixedly carried by said slidable member, a spheroidal bearing member carried by said connecting rod, a draw bar loosely carried by said connecting rod and engaging said bearing member, and means carried by said retaining member for limiting the forward movement of said slidable member.

6. A draft appliance comprising a retaining member, a friction member held by said retaining member and mounted for longitudinal movement within said retaining member, a vertically extending connecting rod fixedly carried by said friction member, a draw bar having an opening therethrough for the reception of said connecting rod, said opening having a diameter greater than said connecting rod, upper and lower spheroidal bearing members carried by said connecting rod and engaging respectively the upper and lower surfaces of said draw bar, locking means carried by said connecting rod whereby the draw bar is held against vertical displacement on said connecting rod, and means carried by said retaining member for limiting the longitudinal movement of said friction member.

7. A draft appliance comprising a retaining member having a base portion and lateral side walls extending toward each other, a slidable member held within said walls and having a shape conforming to the space between the side walls, a connecting rod carried by said slidable member, and a draw bar loosely carried by said connecting rod.

8. In combination with a vehicle, a supporting frame carried by said vehicle, a retaining member carried by said frame having a base portion and lateral side walls extending toward each other, a slidable member held within said walls and having a shape conforming to the space between the side walls, a connecting rod carried by said slidable member, a spheroidal bearing member carried by said connecting rod, and engaging said bearing member.

9. In combination with a vehicle, a retaining member carried by said vehicle, a slidable member carried by said retaining member having a vertically extending connecting rod, an implement having a forwardly extending draw bar loosely carried by said connecting rod, and a draft chain connected to said vehicle and said implement.

10. In combination with a vehicle, a supporting frame carried by said vehicle, a retaining member carried by said frame, a slidable member carried by said retaining member, a vertically extending connecting rod fixedly carried by said slidable member, a spheroidal bearing member carried by said connecting rod, and an implement having a forwardly extending draw-bar loosely carried by said connecting rod and engaging said spheroidal bearing member.

In testimony whereof I have hereunto set my hand.

PEYTON R. JANNEY.